US012762174B2

(12) United States Patent
Bengtsson et al.

(10) Patent No.: US 12,762,174 B2
(45) Date of Patent: Oct. 13, 2026

(54) SYSTEMS AND METHODS FOR AUTOMATIC IDENTIFICATION OF ANOMALOUS DATA

(71) Applicant: N-Power Medicine, Inc., Redwood City, CA (US)

(72) Inventors: Nils Gustav Thomas Bengtsson, San Francisco, CA (US); Mark Lee, Los Altos Hills, CA (US)

(73) Assignee: N-Power Medicine, Inc., Redwood City, CA (US)

( * ) Notice: Subject to any disclaimer, the term of this patent is extended or adjusted under 35 U.S.C. 154(b) by 0 days.

(21) Appl. No.: 18/774,446

(22) Filed: Jul. 16, 2024

(65) Prior Publication Data

US 2026/0023774 A1 Jan. 22, 2026

(51) Int. Cl.

*G06F 16/35* (2025.01)
*G06F 16/34* (2019.01)
*G06F 16/353* (2025.01)

(52) U.S. Cl.

CPC .......... *G06F 16/353* (2019.01); *G06F 16/345* (2019.01)

(58) Field of Classification Search

None
See application file for complete search history.

(56) References Cited

U.S. PATENT DOCUMENTS

| | | | | |
|---|---|---|---|---|
| 11,341,354 | B1 * | 5/2022 | Ko | G06N 3/08 |
| 12,088,600 | B1 * | 9/2024 | Beauchesne | G06N 5/01 |
| 2016/0352767 | A1 * | 12/2016 | Owhadi | H04L 63/1425 |
| 2018/0069880 | A1 * | 3/2018 | Kupreev | H04L 63/1408 |
| 2020/0059482 | A1 * | 2/2020 | Zan | G06F 18/23213 |
| 2021/0035025 | A1 * | 2/2021 | Kalluri | G06F 18/24137 |
| 2021/0150204 | A1 * | 5/2021 | Enuka | G06F 16/137 |
| 2023/0412627 | A1 * | 12/2023 | Szil?Gyi | G06F 11/3438 |
| 2024/0135088 | A1 * | 4/2024 | Saha | G06F 40/289 |
| 2024/0346086 | A1 * | 10/2024 | Jha | G06F 16/901 |

FOREIGN PATENT DOCUMENTS

| | | | | |
|---|---|---|---|---|
| CN | 111782484 A | * 10/2020 | | |
| CN | 112650830 B | * 11/2021 | | G06F 16/3344 |
| CN | 114691868 A | * 7/2022 | | G06F 16/35 |
| CN | 116781389 B | * 12/2023 | | |
| KR | 2022-0131050 A | * 9/2022 | | |

OTHER PUBLICATIONS

Machine Learning to Detect Anomalies in Web Log Analysis, 3rd IEEE International Conference on Computer and Communications, Cao et al (Year: 2017).*

* cited by examiner

*Primary Examiner* — Augustine K. Obisesan
(74) *Attorney, Agent, or Firm* — Pierson Ferdinand LLP; Daniel Rose

(57) ABSTRACT

In some aspects, the disclosure is directed to methods and systems for automatic detection of outliers in unstructured and semi-structured data. In some implementations, unstructured or semi-structured data may be provided to a trained large language model (LLM), which may be used to summarize or extract important tokens or keywords from the data. The extracted tokens or keywords may be used to generate a vector in an n-dimensional space, and compared to other vectors generated from tokens or keywords extracted from other unstructured or semi-structured data. A cluster analyzer may identify clusters or groups of vectors within the n-dimensional space, and may identify outliers or vectors lying outside of the identified clusters or groups.

16 Claims, 5 Drawing Sheets

SYSTEMS AND METHODS FOR AUTOMATIC IDENTIFICATION OF ANOMALOUS DATA

FIELD OF THE DISCLOSURE

This disclosure generally relates to systems and methods for data processing. In particular, this disclosure relates to systems and methods for automatically identifying anomalous data in unstructured data sets.

BACKGROUND OF THE DISCLOSURE

Anomalous data, sometimes referred to as outlier data, non-conforming data, erroneous data, or by similar terms, may comprise data that is poorly correlated with other data in a set. For example, given a set of values for a measurement, such as network latency, a majority of the measurement values may be similar (e.g. within 10-20 ms) when the network is working properly. However, if the network experiences congestion or other error conditions, the measurement values may vary widely (e.g. 1 second, 5 seconds, or any other such value). Such extreme variation in values may indicate the presence of the error condition.

For structured data, or data having a specified syntax and value range such as the latency measurements discussed above, identifying outliers may be relatively easy for computing systems. For example, by measuring latency values over time and determining an average and standard deviation, outliers may be identified based on their value being greater than n standard deviations from the average.

However, for unstructured data, such as freeform data that may lack specified value ranges or standard syntax, it may be difficult for computers to detect outlier data. For example, computers may be incapable of analyzing physician's notes from a patient checkup or diagnostic report, abstracts from scientific papers, or other textual data, due to the computer's lack of understanding of context or meaning. Similarly, while semi-structured data, such as street image data for self-driving cars or depth camera data for automated picking systems in warehouses, may have structure or syntax in their encoding or image compression and be amenable to analysis via histograms or other mathematical tools, computers may be unable to identify outlier objects within the image, such as a cat crossing a street or an employee's hand blocking a box destination. Typical systems instead have to rely on predetermined data sets of expected data (e.g. an image of an empty shelf) for comparison, which may require significant effort to gather, and require large amounts of memory and processing during such comparisons.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
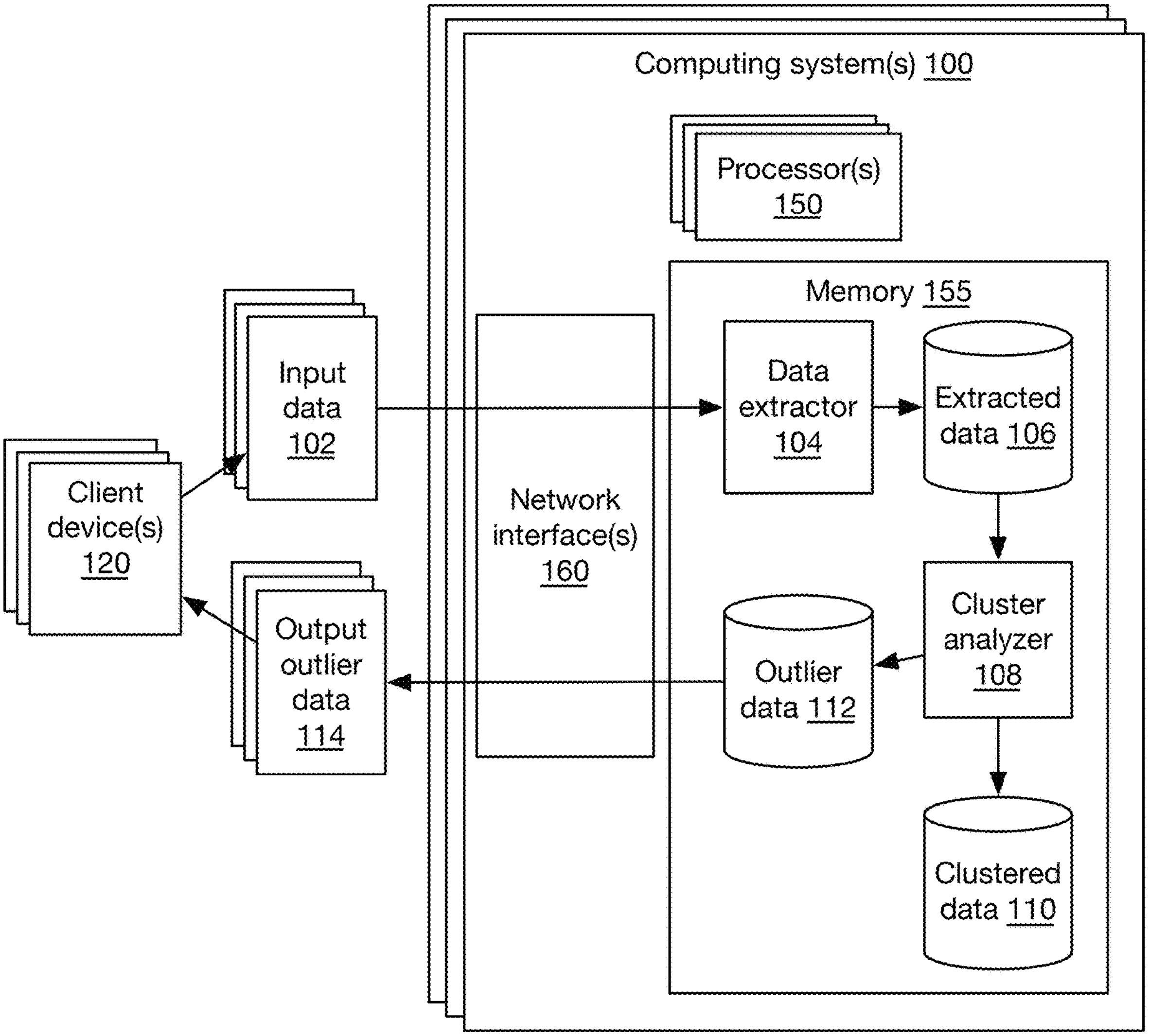
FIG. 1 is a block diagram of an implementation of a system for automatically identifying anomalous data in unstructured or semi-structured data set.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

- Section A describes embodiments of systems and methods for automatic identification of anomalous data; and
- Section B describes a computing environment which may be useful for practicing embodiments described herein.

A. Systems and Methods for Automatic Identification of Anomalous Data

Data may come in various forms, including structured data, unstructured data, and semi-structured data. Structured data may include data with an explicit or implicit syntax, range, or other identifiers, such as measurements of network conditions, processor or memory utilization, visitors to a website, memory sizes of files, or any other such data that can be easily mathematically measured or described. Unstructured data may include data lacking such a syntax or ranges, such as abstracts from scientific papers, physician's notes from a patient checkup or diagnostic report, writing such as novels, essays, or encyclopedia entries, or other such textual data where its meaning is not inherent to its form. Semi-structured data may be a mix of unstructured and structured data, such as invoices with charges and textual descriptions of services or goods, log files with measurements and written descriptions, etc.

Anomalous data, sometimes referred to as outlier data, non-conforming data, erroneous data, or by similar terms, may comprise data that is poorly correlated with other data in a set. For example, measurement values for various conditions may be relatively stable for a time period and then suddenly diverge, indicating a potential problem condition. For structured data, identifying outliers may be relatively easy for computing systems, such as by comparing the measured values to an average or within a sliding window.

However, for unstructured data or semi-structured data including unstructured data, it may be difficult for computers to detect outlier data. For example, computers may be incapable of analyzing physician's notes from a patient checkup or diagnostic report, abstracts from scientific papers, or other textual data, due to the computer's lack of understanding of context or meaning. Likewise, a computer vision system for a self-driving vehicle may be able to identify road markings and signs that match a library of previously captured images, but may be confused when capturing roadside political signs or advertisements. A red sign may be erroneously identified as a stop sign regardless of its textual content. Electronic health records may have wildly different formatting or standards, with relevant patient data found in different places depending on the physician or hospital that prepared them. Other documents, even of the same type, may have very different internal structures, different terminology for the same thing, etc. Typical systems that rely on predetermined data sets of expected data for comparison, which may require significant effort to gather, and require large amounts of memory and processing during such comparisons, may be highly prone to error. Worse, because such systems lack any insight or understanding of the underlying data, they may not be able to identify errors and may act on incorrectly processed data sets as if they were accurate.

Implementations of the systems and methods discussed herein address these and other problems through a combination of two machine learning systems. In some implementations, unstructured or semi-structured data may be provided to a trained large language model (LLM), which may be used to summarize or extract important tokens or keywords from the data. The extracted tokens or keywords may be used to generate a vector in an n-dimensional space, and compared to other vectors generated from tokens or keywords extracted from other unstructured or semi-structured data. A cluster analyzer may identify clusters or groups of vectors within the n-dimensional space, and may identify outliers or vectors lying outside of the identified clusters or groups. Such outliers may represent anomalous data. The anomalous data sources may be identified for further investigation, such as gathering of additional data, verifying captured data, etc.

Although primarily discussed below in connection with unstructured data, as discussed above, semi-structured data may comprise a mix of structured and unstructured data. Implementations of the systems and methods discussed herein may be used with unstructured data, whether part of semi-structured data or separate.

Referring first to FIG. 1, illustrated is a block diagram of an implementation of a system for automatically identifying anomalous data in unstructured data. The system includes one or more computing systems 100, which may comprise desktop computers, workstations, portable computers, computing appliances, computing clusters, server farms, or any other type and form of computing system. The computing systems 100 may be one or more physical computing devices, one or more virtual computing devices executed by one or more physical computing devices (e.g. a server cloud or software-as-a-service), or a mix of physical and virtual computing devices (e.g. a compute network with local storage, a storage cloud with local compute devices, etc.).

In some implementations, computing systems 100 may comprise one or more processors 150, which may comprise any type and form of processor. For example, in many implementations, computing systems 100 may comprise one or more central processing units (CPUs), and may include one or more coprocessing units such as graphics processing units (GPUs) and/or tensor processing units (TPUs). Other processors may be included such as encryption processors, or specialized compression or encoding processors.

In some implementations, computing systems 100 may also include one or more memory devices 155, such as hard disks, flash memory, NAND memory, RAM, or other storage devices. Although shown internal to computing systems 100, in many implementations one or more memory devices 155 may be external to computing systems 100 (e.g. cloud storage, external storage, network attached storage, etc.).

In some implementations, computing systems 100 may also include one or more network interfaces 160 for communicating with other devices via one or more networks. For example, network interfaces 160 may include Ethernet interfaces, 802.11 or WiFi interfaces, cellular interfaces, cable modem interfaces, Bluetooth interfaces, satellite interfaces, or any other type and form of network interfaces. Computing systems 100 may communicate over any type and form of network (not illustrated), including local area networks (LANs), wide area networks (WANs) such as the Internet, private networks, cellular networks, satellite networks, broadband networks, or any other such network or combination of networks. The network may include other devices, including gateways, access points, routers, switches, firewalls, hubs, network accelerators, or any other type and form of device.

In some implementations, computing systems 100 may communicate with one or more client devices 120, which may include desktop computers, laptop computers, portable computers, wearable computers, tablet computers, appliances, or any other computing device. In some implementations, client devices 120 may comprise virtual devices, physical devices, or a combination of virtual and physical devices. In some implementations, a computing system 100 may serve as its own client device 120.

In some implementations, computing systems 100 may receive input data 102 from a client device (or retrieve input data from memory 155, external storage, network locations, or other sources). Input data 102 may comprise unstructured data or semi-structured data as discussed above. Input data 102 may be in any type and form, such as text or alphanumeric data, presentations, spreadsheets, portable document formats (e.g. PDFs), images, multimedia, or any other type and form of data. In some implementations, input data 102 may comprise electronic health records, physicians' notes, drug prescriptions, surgical records, clinical testing records, financial records such as mortgage or loan documents, invoices, statements, or other records, scientific journal abstracts or full text, essays, encyclopedia entries, white papers, product documentation, or other data. In some implementations, an item of input data may represent one document or file. In other implementations, an item of input data may comprise a collection of set of related input data.

In some implementations, computing systems 100 may execute a data extractor 104. Data extractor 104 may comprise an application, service, server, daemon, routine, or other executable logic for parsing and extracting keywords or tokens from unstructured or semi-structured data. Data extractor 104 may comprise software, hardware, or a combination of software and hardware. For example, in some implementations, data extractor 104 may comprise software executed by a tensor processing unit. In some implementations, data extractor 104 may comprise a large language model (LLM) or other natural language processing model. For example, data extractor 104 may comprise an artificial neural network trained on a large corpus of unstructured data (and in some implementations, semi-structured or structured data). Data extractor 104 may be based on any LLM, such as the GPT models developed by OpenAI of San Francisco, California; the Gemini models developed by Google of Mountain View, California; the LLaMA models developed by Meta of Menlo Park, California; or any other such models.

In some implementations, data extractor 104 may parse and extract keywords from input data 102. The extracted data may be generated as a summary, a list of keywords or tokens, or other such formats. In some implementations, the extracted data may be filtered to a predetermined set of keywords. For example, given input data of thousands or millions of documents, the data extractor 104 may parse and extract the most commonly appearing top thousand (or five thousand, or ten thousand, or five hundred, or any other appropriate number) keywords or tokens (e.g. a first document may include 20 of the subset of the top-1000 used keywords as well as other keywords, a second document may include 15 of those keywords in addition to other keywords, etc.; to limit the data set for analysis, the extracted data may be limited to the top subset). In some implementations, this set may be manually generated, e.g. by a developer or administrator of the system. In other implementations, this set may be automatically generated. For example, as discussed above, the set may be generated based on the most common or frequent keywords or tokens. In another implementation, the set may be generated iteratively during a training process. For example, the system may utilize randomly selected subsets of keywords from a keyword corpus (e.g. a random selection of 100 keywords), and perform extraction, parsing, vectorization, and anomaly detection as discussed herein. This may be repeated (serially or in parallel) for different randomly selected subsets to identify a most-sensitive subset. In a similar implementation, a first subset of keywords may be selected and additional keywords randomly added to the subset in various iterations for processing (again, serially or in parallel). For example, a first top 20 keywords may be utilized as a base set and then 10 additional keywords randomly selected for each different processing and analysis iteration. This may allow for automated discovery of keywords or combinations of keywords that are highly relevant to anomaly detection, even if they aren't obvious or apparent initially.

In many implementations, the data extractor 104 may identify similar words or tokens as associated with or corresponding to the same keyword (e.g. "spouse," "significant other", "partner", "husband", "wife", etc.). Accordingly, an extracted keyword may not directly match the input data, but may be a corresponding or associated keyword. This may be particularly useful when input data comes from different sources using different, but similar terminology (e.g. "computer", "computing device", "laptop", "PC", etc.). In many implementations, keywords may not be labeled or otherwise explicitly identified within the input data, and the data extractor 104 may extract keywords based on contextual relevance (e.g. via natural language processing, principal component analysis, semantic organization, etc.).

In some implementations, data extractor 104 may store extracted keywords or tokens in an extracted data database 106. Extracted data 106 may be stored in any suitable form, such as a flat file, array, spreadsheet, relational database, or any other format. In some implementations, extracted data 106 may comprise a bitmap or array of values corresponding to keywords, indexed by an input data identifier (e.g. document identifier, document name, globally unique identifier (GUID), etc.). For example, given keywords or tokens a, b, c . . . z, the extracted data may comprise a set of {file1, 0, 1, 1, 0, 1, 0 . . . }, {file2, 0, 1, 0, 1, 1, 0 . . . }, etc. with a predetermined bit or value indicating the presence of the keyword or token (or a similar keyword or token) in the corresponding input data. In some implementations, these values may be weighted or multiplied by a coefficient (e.g. the most often appearing keywords may be given a higher weight than least often appearing keywords in some implementations to aid clustering, or may be given a lower weight than least often appearing keywords in other implementations to aid differentiation between similar input data). In some implementations, the values may be weighted or multiplied by a coefficient based on their frequency of appearance within the corresponding item of input data (e.g. a keyword that appears once may be weighted less heavily than a keyword that appears multiple times in the same document, indicating it may be less relevant).

In some implementations, computing system(s) 100 may execute a cluster analyzer 108. Cluster analyzer 108 may comprise an application, service, server, daemon, or other executable logic for identifying clusters of data points or vectors within an n-dimensional space. Cluster analyzer 108 may comprise software, hardware, or a combination of software and hardware. For example, in some implementations, cluster analyzer 108 may comprise software executed by a tensor processing unit. In some implementations, cluster analyzer 108 may comprise a k-means cluster analyzer, a distribution model cluster analyzer, an unsupervised neural network, a self-organizing map, or any other type and form of cluster analyzer. In many implementations, the cluster analyzer may be considered a hard clusterer—that is, data points need not belong to any cluster.

In some implementations, cluster analyzer 108 may use the extracted keywords or tokens of extracted data 106 to plot data points or vectors within an n-dimensional space (e.g. with n corresponding to the total number of extracted keywords or tokens, or in some implementations, a subset of the total number of extracted keywords or tokens, such as the top hundred, top thousand, top five thousand, etc.). A data point or vector may be plotted for each item of data in the input data, or in some implementations, a collection of related input data. Cluster analyzer 108 may then identify clusters in the plotted data points or vectors in the n-dimensional space, and, in some implementations, centroids of each cluster.

Figure 2:
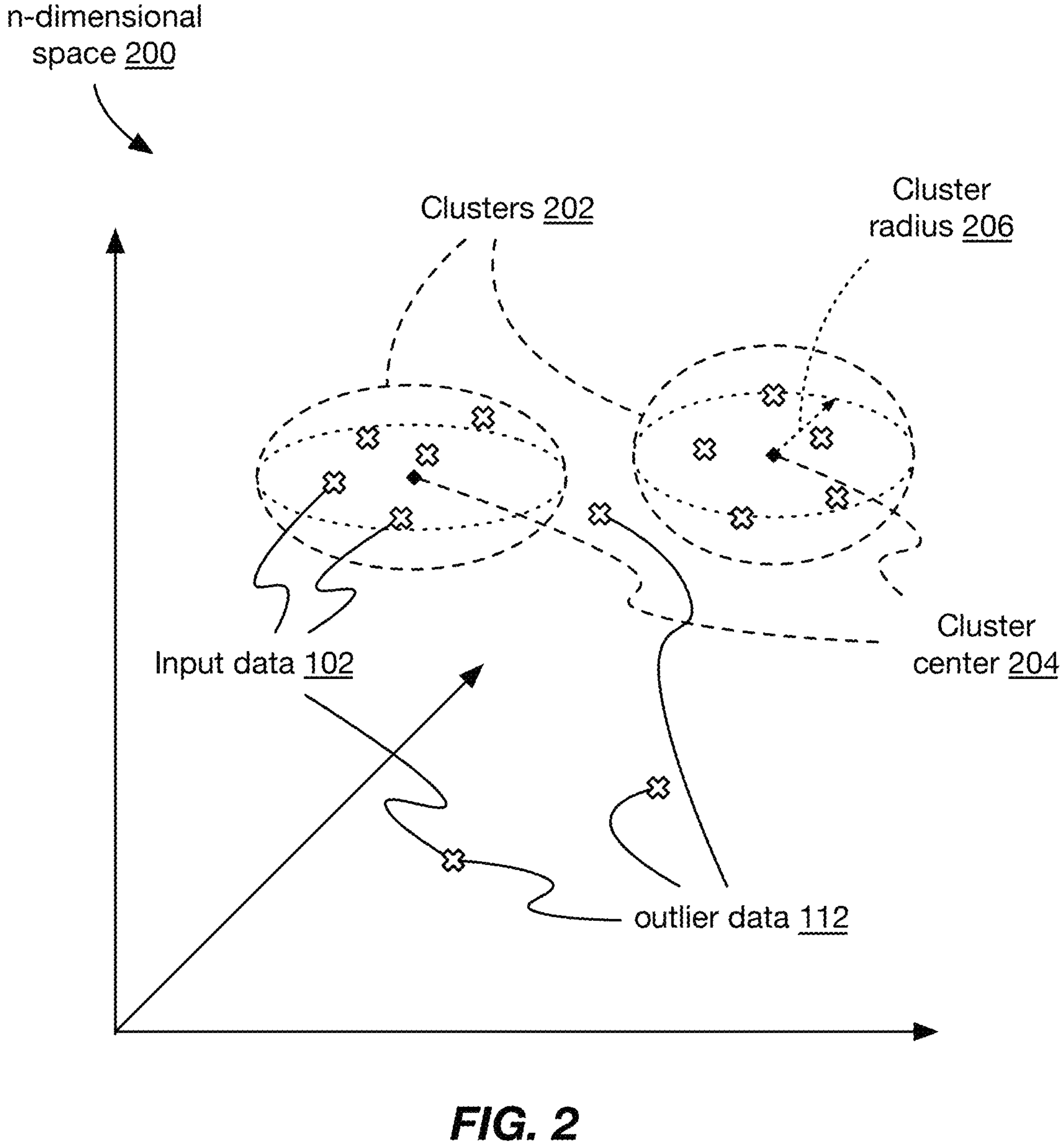
FIG. 2 is an illustration of an example of vectors and clusters plotted in an n-dimensional space.

For example, referring briefly to FIG. 2, illustrated is an example of vectors and clusters plotted in an n-dimensional space 200 (the illustration shows three dimensions for convenience, but the n-dimensional space may have any number of dimensions). Examples of vectors or points corresponding to keywords or tokens extracted from input data are shown as crosses 102, and are plotted within the space. In some implementations, each axis may correspond to a keyword or token (which may be limited in number to a top n number of keywords or tokens, as discussed above). In other implementations, multiple keywords may correspond to an axis, such as disjoint keywords or keywords that are mutually exclusive (e.g. input data locations such as cities or server addresses, positive or negative answers to a query, etc.). For example, in one such implementation in which the input data represents population demographic data from a plurality of cities, the extracted keywords for each input data item may identify a corresponding city, and each may represent a different position along an axis (e.g. a city axis with city 1, city 2, city 3, . . . city n). The space may include a mix of single-value axes (e.g. indicating the presence or absence of a keyword or token) and multi-value axes (e.g. for related disjoint data values). In some implementations.

As shown, input data points or vectors 102 may be sorted into clusters 202 by the cluster analyzer. Each cluster 202 may have a corresponding center or centroid 204. Although shown as spheres, in many implementations, clusters may be hyperspheres or n-spheres. In some such implementations, the sphere (or n-sphere) may have a cluster radius 206 representing a distance from the center or centroid to the border of the cluster. In other implementations, clusters may be irregular (e.g. oblong, polygonal, etc.), and may be defined by volume. For example, in some implementations, a cluster 202 may be a region of n-dimensional polygonal hypervoxels.

As shown, because each cluster 202 has a defined boundary that is not contiguous with each neighboring cluster, there exist spaces between clusters 202. Input data points or vectors 102 in these spaces may be referred to as outlier data 112, anomalous data, erroneous data, incorrect data, suspect data, or by other such terms. Although the system may lack insight or knowledge of why the input data is anomalous—and crucially, can't determine whether a data point is anomalous inherently or based on only information from that item of data, by identifying a lack of correlation between the item of data and other items of data (e.g. by not being within any cluster boundary), the system may automatically be able to identify the item of data as an outlier or anomalous.

In some implementations, the radii 206 or boundaries of clusters 202 may be dynamically adjusted by the system to control the number of outlier data points. For example, in some implementations, a threshold number or percentage of anomalous input data points relative to all input data points may be set by an administrator or user. The cluster analyzer may dynamically adjust the volumes of the clusters until the threshold number or percentage is reached (e.g. shrinking volumes to increase the number of identified anomalous or outlier data points, or expanding volumes to reduce the number of identified anomalous or outlier data points).

Returning to FIG. 1, the cluster analyzer 108 may store identifications of clusters 202 (and related volumes or radii, and/or data points within clusters) in a database 110, and may store identifications of outlier data 112 in the same or a different database. In some implementations, databases 106, 110, and 112 may be combined (e.g. a cluster identifier may be added to extracted data 106 to indicate that an item of input data belongs to a specified cluster, or a tag (or null cluster identifier) may be added to indicate that the item of input data is an outlier or belongs to no cluster. Although shown internal to memory 155 and computer system(s) 100, in some implementations, one or all of databases 106, 110, 112 may be stored externally to the system (e.g. in cloud storage, on a storage device, etc.).

In some implementations, the computing system(s) 100 may provide identifications of outlier data items 114 to client device(s) 120. For example, the computing system(s) 100 may add a tag or other identifier to an item of input data, may provide a list of anomalous items of input data, or otherwise indicate that an item of input data may be incorrect, suspect, or anomalous. In some implementations, client device(s) 120 may review the identified outlier data items and may gather additional information (e.g. perform additional measurements that may make the data no longer an outlier), verify existing information (e.g. verify existing values to be sure they were not recorded incorrectly), or otherwise confirm whether the data item is truly an outlier or whether there was an error in data gathering or collation.

Figure 3:
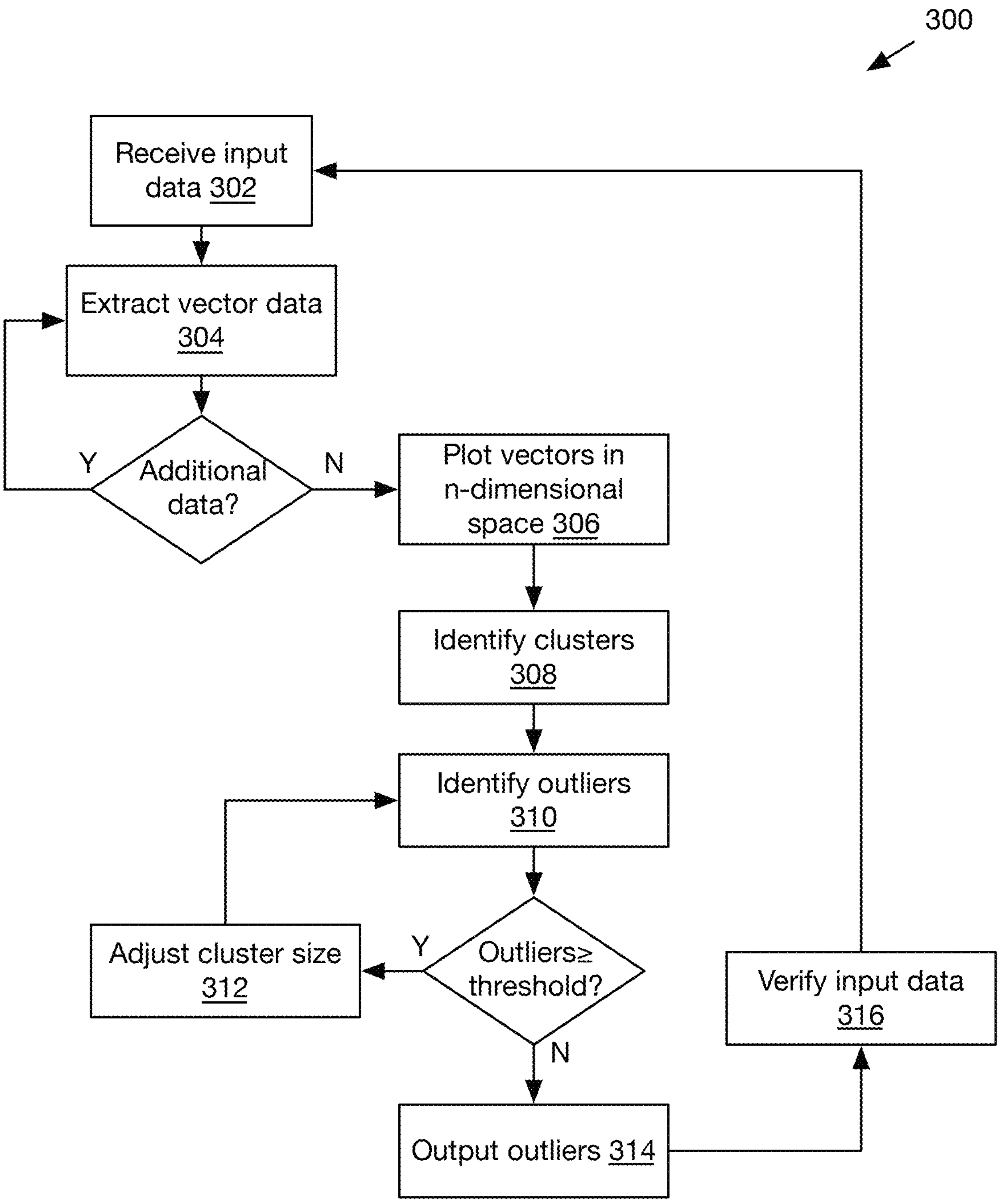
FIG. 3 is a flow chart of an implementation of a method for automatically identifying anomalous data in unstructured or semi-structured data set.

FIG. 3 is a flow chart of an implementation of a method 300 for automatically identifying anomalous data in unstructured or semi-structured data set. At step 302, in some implementations, a computer system may receive a plurality of items of input data. The input data may be in any suitable format, and may comprise unstructured data, or a combination of structured and unstructured data. For example, in some implementations, the data may comprise physicians' notes, electronic healthcare records, clinical test data, financial data, scientific papers or whitepapers, or any other textual data. Receiving the data may comprise receiving the data from a client computing device, retrieving the data from memory or a storage device, scanning the data via a document scanner, or otherwise obtaining the data.

In some implementations, multiple items of input data may be related. For example, many input documents may be related to a common source, user, author, subject, etc. Such documents need not be processed simultaneously. For example, in some implementations, the system may receive a first item of input data, process the item as discussed above to identify any outliers, and may subsequently receive a second item of input data related to the first item, and may process it to identify any outliers. In some implementations, the related items of data (including items of data received later) may be grouped together, concatenated, or otherwise associated.

At step 304, in some implementations, the computer system may extract vector data from an item of data. In some implementations, extracting vector data may comprise processing or summarizing the item of data via a large language model to identify keywords or tokens of relevance. In some implementations, the extracted vector data may be filtered to a subset of keywords or tokens (e.g. the n keywords or tokens most often appearing in the summarized or extracted vector data for all data items, a predetermined subset of keywords or tokens, etc.). The keywords or tokens may be keywords or tokens not present in the item of data, but associated with keywords in the item of data, such as equivalent terminology. The vectors may be stored in an array, bitmap, list, or other suitable data structure. For example, in some implementations, the vectors may comprise a bitmap with values indicating the presence or absence of a particular token or keyword from a predetermined set. Step 304 may be repeated for each item of input data (either in serial or in parallel, such as via a plurality of processing units distributing the documents to be processed amongst themselves).

In some implementations, time between creation of items of data may be a relevant metric. For example, a first plurality of items of data may be associated and have varying creation dates, and a second plurality of items of data may be associated and have different creation dates. The dates and/or intervals between them may be included as part of the keywords and/or tokens or otherwise included in the extracted vector data such that changes in data over time may be identified as potentially anomalous. For example, a set of changes to an item of data (or related items of data) over days or weeks may be considered normal when compared to similar changes to other data, but the identical changes over seconds or minutes may be considered anomalous (e.g. identifying, for example, a potential malicious actor or data corruption). Accordingly, creation dates or times, modification dates or times, access dates or times, or intervals between any of these may be included as values when generating vectors.

At step 306, in some implementations, the computer system may plot the vectors in an n-dimensional space. In some implementations, the number of dimensions may be equivalent to the number of keywords or tokens in a predetermined subset of keywords or tokens. In other implementations, one or more dimensions or axes may represent a plurality of keywords (e.g. disjoint keywords or keywords for which an item of data can have at most one present). In some implementations, plotting the vectors may comprise multiplying a value for a keyword or token by a weight or coefficient. As discussed above, in various implementations, the weight or coefficient may be proportional or inversely proportional to the popularity or frequency of the keyword or token in the predetermined subset or in the items of data.

At step 308, in some implementations, the computer system may identify one or more clusters in the plotted vectors or points in the n-dimensional space. The computer system may use any suitable classifier, such as an artificial neural network, a k-means classifier, a Gaussian classifier, or any other suitable algorithm. In some implementations, the clusters may have a predetermined radius or volume boundary. In other implementations, the radius or volume boundary of a cluster may be determined based on the density of points or vectors within the cluster. In many implementations, clusters may not meet or not all clusters may meet—that is, the n-dimensional space may include regions not within any cluster or external to all clusters.

At step 310, in some implementations, the computer system may identify any outlier data points or vectors external to any cluster or not included within any cluster. In some implementations, the computer system may determine a centroid or center for each of the one or more clusters, and assign vectors to a cluster based on a distance between the vector and the centroid being less than a threshold radius or distance. In some implementations, the computer system may determine a volume for each of the one or more clusters, and assign vectors to a cluster based on the vector being within the volume.

In some implementations, the computer system may determine whether the number or percentage of outlier data points or vectors is greater than or less than a threshold (or outside a predetermined range, such as 5-10% or 1-5% or 5-20 data points or any other suitable range). If so, at step 312, the cluster sizes may be adjusted. For example, if the number or percentage of outlier data points exceeds a threshold or range, the cluster radii or volumes may be increased. If the number or percentage of outlier data points is less than a threshold or range, the cluster radii or volumes may be decreased. This may be done iteratively until the number or percentage of outlier data points is within the threshold or range, repeating steps 310-312.

At step 314, the computer system may output a list or set of the identified outliers and/or the associated input items of data. The output may be provided to a client device, displayed via a display, printed, or otherwise provided for further analysis. At step 316, the identified outliers may be verified or reviewed, such as by reviewing the items of data for accuracy, performing additional data gathering or measurements, or otherwise determining whether the outliers are true outliers. For example, outliers may be due to errors within the data (e.g. due to inaccurate recording, due to abstraction, copy/paste errors, source data issues, etc.); may be due to errors in the data extraction at step 304, in which case they may be used for retraining the LLM; or may represent true outlier data items, which may be used for retraining the classifier via a supervised learning process.

Accordingly, implementations of the systems and methods discussed provide automatic detection of outliers in unstructured and semi-structured data, through a combination of two machine learning systems. In some implementations, unstructured or semi-structured data may be provided to a trained large language model (LLM), which may be used to summarize or extract important tokens or keywords from the data. The extracted tokens or keywords may be used to generate a vector in an n-dimensional space, and compared to other vectors generated from tokens or keywords extracted from other unstructured or semi-structured data. A cluster analyzer may identify clusters or groups of vectors within the n-dimensional space, and may identify outliers or vectors lying outside of the identified clusters or groups.

In some aspects, the present disclosure is directed to a method for automatic identification of anomalous data. The method includes receiving, by a computing system comprising one or more processors, a plurality of items of data. The method also includes, for each item of data of the plurality of items of data: extracting, by the computing system using a trained language model, a plurality of keywords; and generating, by the computing system, a vector based on the extracted plurality of keywords. The method also includes grouping, by the computing system, the vectors into one or more clusters in an n-dimensional space. The method also includes identifying, by the computing system, at least one item of data corresponding to a vector external to every cluster of the one or more clusters. The method also includes providing, by the computing system, the identified at least one item of data as anomalous data.

In some implementations, the plurality of items of data comprise unstructured data. In some implementations, the plurality of items of data lack identifiers of the plurality of keywords.

In some implementations, the method includes generating a keyword-based summary of the item of data via the trained language model. In some implementations, the method includes identifying a value corresponding to each keyword, each value corresponding to a dimension of the n-dimensional space. In some implementations, the method includes calculating a value for each keyword based on a value for the keyword and a weight corresponding to the keyword.

In some implementations, the method includes determining a centroid for each of the one or more clusters, and assigning vectors to a cluster based on a distance between the vector and the centroid being less than a threshold. In a further implementation, the method includes adjusting the threshold until a predetermined percentage of vectors are external to every cluster of the one or more clusters.

In some implementations, the method includes determining a volume for each of the one or more clusters, and assigning vectors to a cluster based on the vector being within the volume. In a further implementation, the method includes adjusting the volume until a predetermined percentage of vectors are external to every cluster of the one or more clusters.

In another aspect, the present disclosure is directed to a system for automatic identification of anomalous data. The system includes a computing system comprising one or more processors. The one or more processors are configured to receive a plurality of items of data. The one or more processors are also configured to, for each item of data of the plurality of items of data: extract, using a trained language model, a plurality of keywords; and generate a vector based on the extracted plurality of keywords; The one or more processors are also configured to group the vectors into one or more clusters in an n-dimensional space. The one or more processors are also configured to identify at least one item of data corresponding to a vector external to every cluster of the one or more clusters. The one or more processors are also configured to provide the identified at least one item of data as anomalous data.

In some implementations, the plurality of items of data comprise unstructured data. In some implementations, the plurality of items of data lack identifiers of the plurality of keywords. In some implementations, the one or more processors are further configured to extract the plurality of keywords from an item of data by generating a keyword-based summary of the item of data via the trained language model. In some implementations, the one or more processors are further configured to generate the vector based on the extracted plurality of keywords by identifying a value corresponding to each keyword, each value corresponding to a dimension of the n-dimensional space. In some implementations, the one or more processors are further configured to generate the vector based on the extracted plurality of keywords by calculating a value for each keyword based on a value for the keyword and a weight corresponding to the keyword.

In some implementations, the one or more processors are further configured to determine a centroid for each of the one or more clusters, and assign vectors to a cluster based on a distance between the vector and the centroid being less than a threshold. In a further implementation, the one or more processors are further configured to adjust the threshold until a predetermined percentage of vectors are external to every cluster of the one or more clusters.

In some implementations, the one or more processors are further configured to determine a volume for each of the one or more clusters, and assign vectors to a cluster based on the vector being within the volume. In a further implementation, the one or more processors are further configured to adjust the volume until a predetermined percentage of vectors are external to every cluster of the one or more clusters.

B. Computing Environment

Having discussed specific embodiments of the present solution, it may be helpful to describe aspects of the operating environment as well as associated system components (e.g., hardware elements) in connection with the methods and systems described herein.

Figure 4A:
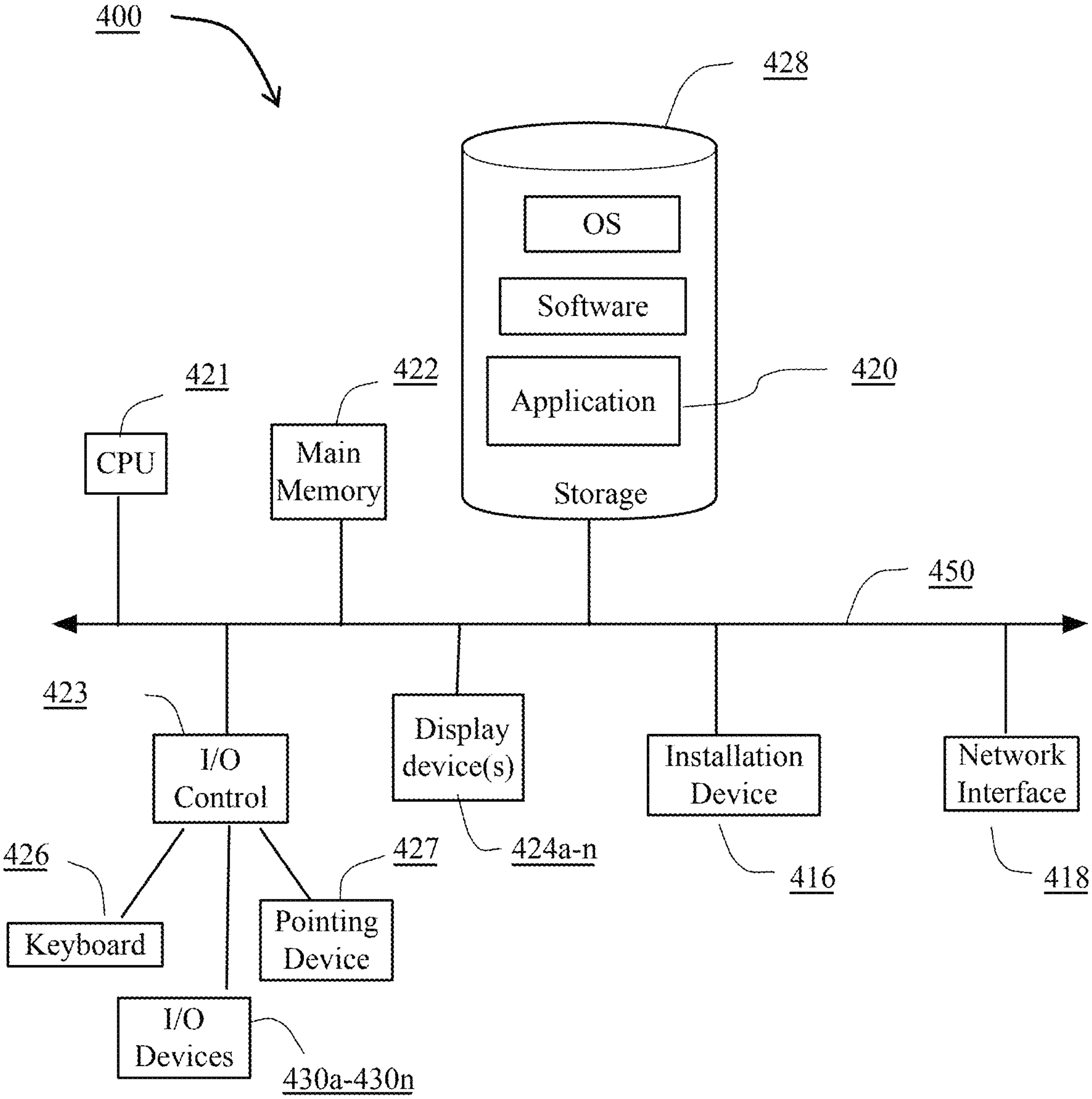
FIGS. 4A and 4B are block diagrams depicting embodiments of computing devices useful in connection with the methods and systems described herein.
Figure 4B:
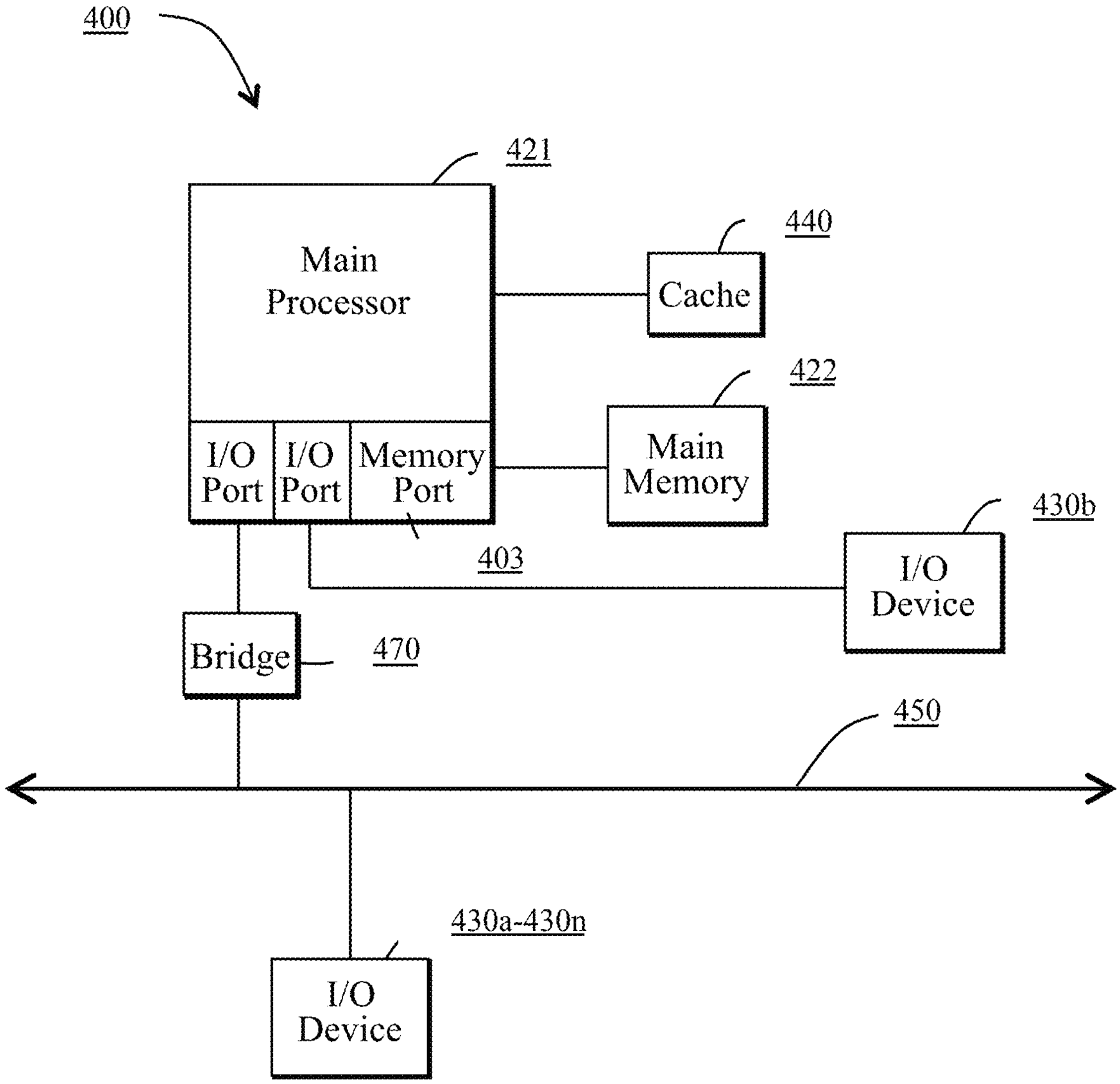

The systems discussed herein may be deployed as and/or executed on any type and form of computing device, such as a computer, network device or appliance capable of communicating on any type and form of network and performing the operations described herein. FIGS. 4A and 4B depict block diagrams of a computing device 400 useful for practicing an embodiment of the wireless communication devices 402 or the access point 406. As shown in FIGS. 4A and 4B, each computing device 400 includes a central processing unit 421, and a main memory unit 422. As shown in FIG. 4A, a computing device 400 may include a storage device 428, an installation device 416, a network interface 418, an I/O controller 423, display devices 424*a*-424*n*, a keyboard 426 and a pointing device 427, such as a mouse. The storage device 428 may include, without limitation, an operating system and/or software. As shown in FIG. 4B, each computing device 400 may also include additional optional elements, such as a memory port 403, a bridge 470, one or more input/output devices 430*a*-430*n* (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4A, the processor 421 communicates with main memory 422 via a system bus 450 (described in more detail below). FIG. 4B depicts an embodiment of a computing device 400 in which the processor communicates directly with main memory 422 via a memory port 403. For example, in FIG. 4B the main memory 422 may be DRDRAM.

FIG. 4B depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4B, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4B depicts an embodiment of a computer 400 in which the main processor 421 may communicate directly with I/O device 430*b*, for example via HYPERTRANSPORT, RAPIDIO, or INFINIBAND communications technology. FIG. 4B also depicts an embodiment in which local busses and direct communication are mixed: the processor 421 communicates with I/O device 430*a* using a local interconnect bus while communicating with I/O device 430*b* directly.

A wide variety of I/O devices 430*a*-430*n* may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4A. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, California.

Referring again to FIG. 4A, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424*a*-424*n*. As such, any of the I/O devices 430*a*-430*n* and/or the I/O controller 423 may include any type and/or form of suitable hardware, software, or combination of hardware and software to support, enable or provide for the connection and use of the display device(s) 424*a*-424*n* by the computing device 400. For example, the computing device 400 may include any type and/or form of video adapter, video card, driver, and/or library to interface, communicate, connect or otherwise use the display device(s) 424*a*-424*n*. In one embodiment, a video adapter may include multiple connectors to interface to the display device(s) 424*a*-424*n*. In other embodiments, the computing device 400 may include multiple video adapters, with each video adapter connected to the display device(s) 424*a*-424*n*. In some embodiments, any portion of the operating system of the computing device 400 may be configured for using multiple displays 424*a*-424*n*. One ordinarily skilled in the art will recognize and appreciate the various ways and embodiments that a computing device 400 may be configured to have one or more display devices 424*a*-424*n*.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4A and 4B may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for automatic identification of anomalous data, comprising:

receiving, by a computing system comprising one or more processors, a plurality of items of data;

for each item of data of the plurality of items of data:

generating, by the computing system using a trained language model, a keyword-based summary of the item of data, extracting, by the computing system using the summary generated by the trained language model, a plurality of keywords, and generating, by the computing system, a vector based on the extracted plurality of keywords;

grouping, by the computing system, the vectors into one or more clusters in an n-dimensional space by determining a volume for each of the one or more clusters, assigning vectors to a cluster based on the vector being within the volume, and adjusting the volume of each cluster until a predetermined percentage of vectors are external to every cluster of the one or more clusters;

identifying, by the computing system, at least one item of data corresponding to a vector external to every cluster of the one or more clusters; and providing, by the computing system, the identified at least one item of data as anomalous data.

2. The method of claim 1, wherein the plurality of items of data comprise unstructured data.

3. The method of claim 1, wherein the plurality of items of data lack identifiers of the plurality of keywords.

4. The method of claim 1, wherein generating the vector based on the extracted plurality of keywords comprises identifying a value corresponding to each keyword, each value corresponding to a dimension of the n-dimensional space.

5. The method of claim 1, wherein generating the vector based on the extracted plurality of keywords comprises calculating a value for each keyword based on a value for the keyword and a weight corresponding to the keyword.

6. The method of claim 1, wherein grouping the vectors into one or more clusters comprises determining a centroid for each of the one or more clusters, and assigning vectors to a cluster based on a distance between the vector and the centroid being less than a threshold.

7. A method for automatic identification of anomalous data, comprising:

receiving, by a computing system comprising one or more processors, a plurality of items of data;

for each item of data of the plurality of items of data:

extracting, by the computing system using a trained language model, a plurality of keywords, and generating, by the computing system, a vector based on the extracted plurality of keywords;

grouping, by the computing system, the vectors into one or more clusters in an n-dimensional space by determining a centroid for each of the one or more clusters, and:

(a) assigning vectors to a cluster based on a distance between the vector and the centroid being less than a first threshold, (b) determining whether a percentage of vectors not assigned to any cluster is less than a second threshold, and (c) repeating (a)-(b) while adjusting the first threshold until the percentage of vectors not assigned to any cluster is equal to or greater than the second threshold;

identifying, by the computing system, at least one item of data corresponding to a vector external to every cluster of the one or more clusters; and providing, by the computing system, the identified at least one item of data as anomalous data.

8. The method of claim 7, wherein extracting the plurality of keywords from an item of data comprises generating a keyword-based summary of the item of data via the trained language model.

9. A system for automatic identification of anomalous data, comprising:

a computing system comprising one or more processors, the one or more processors configured to:

receive a plurality of items of data;

for each item of data of the plurality of items of data:

extract, using a trained language model, a plurality of keywords, and generate, by the computing system, a vector based on the extracted plurality of keywords;

group the vectors into one or more clusters in an n-dimensional space by determining a centroid for each of the one or more clusters, assigning vectors to a cluster based on a distance between the vector and the centroid being less than a threshold, and adjusting the threshold until a predetermined percentage of vectors are external to every cluster of the one or more clusters;

identify at least one item of data corresponding to a vector external to every cluster of the one or more clusters; and provide the identified at least one item of data as anomalous data.

10. The system of claim 9, wherein the plurality of items of data comprise unstructured data.

11. The system of claim 9, wherein the plurality of items of data lack identifiers of the plurality of keywords.

12. The system of claim 9, wherein the one or more processors are further configured to extract the plurality of keywords from an item of data by generating a keyword-based summary of the item of data via the trained language model.

13. The system of claim 9, wherein the one or more processors are further configured to generate the vector based on the extracted plurality of keywords by identifying a value corresponding to each keyword, each value corresponding to a dimension of the n-dimensional space.

14. The system of claim 9, wherein the one or more processors are further configured to generate the vector based on the extracted plurality of keywords by calculating a value for each keyword based on a value for the keyword and a weight corresponding to the keyword.

15. The system of claim 9, wherein the one or more processors are further configured to determine a volume for each of the one or more clusters, and assign vectors to a cluster based on the vector being within the volume.

16. The system of claim 15, wherein the one or more processors are further configured to adjust the volume until a predetermined percentage of vectors are external to every cluster of the one or more clusters.

* * * * *